United States Patent
Kim

(10) Patent No.: US 10,490,206 B2
(45) Date of Patent: Nov. 26, 2019

(54) TESTING DEVICE CAPTURE PERFORMANCE FOR MULTIPLE SPEAKERS

(71) Applicant: Dolby Laboratories Licensing Corporation, San Francisco, CA (US)

(72) Inventor: Doh-Suk Kim, Cupertino, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/776,542

(22) PCT Filed: Jan. 17, 2017

(86) PCT No.: PCT/US2017/013806
§ 371 (c)(1),
(2) Date: May 16, 2018

(87) PCT Pub. No.: WO2017/127367
PCT Pub. Date: Jul. 27, 2017

(65) Prior Publication Data
US 2018/0350393 A1   Dec. 6, 2018

Related U.S. Application Data

(60) Provisional application No. 62/280,591, filed on Jan. 19, 2016, provisional application No. 62/333,105, filed on May 6, 2016.

(51) Int. Cl.
*G10L 25/69* (2013.01)
*G10L 25/60* (2013.01)
(Continued)

(52) U.S. Cl.
CPC .......... *G10L 25/69* (2013.01); *H04M 3/2236* (2013.01); *H04M 3/56* (2013.01); *H04R 29/007* (2013.01);
(Continued)

(58) Field of Classification Search
CPC combination set(s) only.
See application file for complete search history.

(56) References Cited

U.S. PATENT DOCUMENTS 6,804,651 B2 * 10/2004 Juric .................. G10L 25/69
381/120
7,139,705 B1 * 11/2006 Beerends ............ G10L 25/69
704/237

(Continued)

FOREIGN PATENT DOCUMENTS

CN          104485114      4/2015
EP           2922058       9/2015

OTHER PUBLICATIONS

Gaoxiong, Y. et al "The Perceptual Objective Listening Quality Assessment Algorithm in Telecommunication" First IEEE International Conference on Communications in China: Signal Processing for Communications (SPC), pp. 351-355, Aug. 2012.

(Continued)

*Primary Examiner* — Samuel G Neway

(57) ABSTRACT

Systems and methods are described for measuring capture performance of multiple voice signals. A first speech signal is applied to a device, and measured at far-end at a far-end of a testing environment. A second speech signal is separately applied to the device, and is also measured at the far end. The measured speech signals are added, and a quality assessment model is applied to the first far-end combined signal to obtain a first quality metric. The first speech signal and the second speech signal are then both applied at the same time to the device and measured at the far-end. The quality assessment model is applied to the second far-end combined signal to obtain a second quality metric. The quality metric for the second far-end combined signal is (Continued)

normalized, based on the first quality metric, to obtain a performance index for the device.

20 Claims, 6 Drawing Sheets

(51) Int. Cl.
*H04R 29/00* (2006.01)
*H04M 3/22* (2006.01)
*H04M 3/56* (2006.01)

(52) U.S. Cl.
CPC ........ *G10L 25/60* (2013.01); *H04R 2227/009* (2013.01); *H04S 2400/15* (2013.01)

(56) References Cited

U.S. PATENT DOCUMENTS

| | | | |
|---|---|---|---|
| 8,583,423 | B2 | 11/2013 | Grancharov |
| 9,064,502 | B2 | 6/2015 | Taal |
| 9,560,316 | B1* | 1/2017 | Lindberg ................. H04N 7/15 |
| 2006/0177003 | A1* | 8/2006 | Keyhl ..................... G10L 25/69 379/27.01 |
| 2006/0200346 | A1 | 9/2006 | Chan |
| 2011/0119039 | A1* | 5/2011 | Grancharov ............ G10L 25/69 703/2 |
| 2012/0020484 | A1* | 1/2012 | Grancharov ............ G10L 25/69 381/56 |
| 2014/0003611 | A1 | 1/2014 | Mohammad |
| 2014/0193009 | A1 | 7/2014 | Yousefian Jazi |
| 2014/0316773 | A1 | 10/2014 | Beerends |
| 2015/0006162 | A1 | 1/2015 | Sen |
| 2015/0092950 | A1 | 4/2015 | Kim |
| 2015/0112672 | A1 | 4/2015 | Giacobello |
| 2015/0199959 | A1 | 7/2015 | Skoglund |
| 2015/0340047 | A1 | 11/2015 | Beerends |
| 2017/0094420 | A1* | 3/2017 | Boldt ................... H04R 25/405 |
| 2017/0311092 | A1* | 10/2017 | Secall ................. H04R 25/554 |
| 2018/0350393 | A1* | 12/2018 | Kim ..................... H04R 29/007 |

OTHER PUBLICATIONS

ETSI TS 102 925 "Speech and Multimedia Transmission Quality (STQ); Transmission Requirements for Superwideband/Fullband handsfree and Conferencing Terminals from a QoS Perspective as Perceived by the User" Mar. 2013.

ITU-T P.340 "Transmission Characteristics and Speech Quality Parameters of Hands-Free Terminals" Amendment 1: New Annex B: Objective Test Methods for Multi-taker Scenarios, Oct. 2014.

ITU-T "Test Signals for Use in Telephonometry" Series P: Telephone Transmission Quality, Telephone Installations, Local Line Networks Objective Measuring Apparatus, May 2004.

ITU Gierlich Head Acoustics GMBH Germany Study Group 12 "Evaluation of the Annex B of ITU-T Recommendation P.340, C0252" Apr. 2015, pp. 1-14.

Beerends, J. et al "Perceptual Objective Listening Quality Assessment (POLQA), The Third Generation ITU-T Standard for End-to-End Speech Quality Measurement Part II-Perceptual Model" Jun. 2013, pp. 385-402.

* cited by examiner

TESTING DEVICE CAPTURE PERFORMANCE FOR MULTIPLE SPEAKERS

CROSS-REFERENCE TO RELATED APPLICATION

This application claims the benefit of U.S. Provisional Application Nos. 62/280,591, filed Jan. 19, 2016 and 62/333,105, filed May 6, 2016, which are hereby incorporated by references in their entirety.

TECHNICAL FIELD

Embodiments herein relate generally to audio signal processing, and more specifically to testing and measuring capture performance of a device for multi-party conferencing scenarios.

SUMMARY OF THE INVENTION

Systems and methods are described for providing improved capture performance of a device for multiple voice signals. The testing of a device, in an embodiment, includes a reference phase, where a first speech signal is applied to a device at a first angle. The first speech signal may be measured at a far-end of a testing environment to obtain a far-end first speech signal. After the applying the first speech signal, a second speech signal is separately applied to the device at a second angle. The second speech signal is also measured at the far end to obtain a far-end second speech signal. The far-end first speech signal and the far-end second speech signal may be added by linear addition to obtain a first far-end combined signal. A quality assessment model (such as POLQA) may be applied to the first far-end combined signal to obtain an objective perceptual quality metric for the first far-end combined signal.

After the reference phase, a test phase may be executed, which includes applying a combination signal, including both the first speech signal at the first angle and the second speech signal at the second angle being applied at substantially the same time. The applying both signals may take place after the separate applying the first speech signal and the second speech signal in the reference phase. The combination signal may be measured at the far-end to obtain a second far-end combined speech signal. The quality assessment model may be applied to the second far-end combined signal to obtain a perceptual quality metric for the second far-end combined signal. The perceptual quality metric for the second far-end combined signal is normalized, based on the perceptual quality metric for the first far-end combined signal, to obtain a performance index for the device.

The performance index may accurately assess the device's performance for simultaneous talkers, and may be used in a variety of applications. For example, during product development, a capture property of the device may be adjusted, such that the adjusting increases a value of the performance index in subsequent testing. In another embodiment, the performance index may be used in device quality control testing. For example, the performance index may be compared to an expected value range. The device may be approved if the performance index of the device falls within the expected value range. If the device has a performance index that falls outside the expected value range, approval may be denied. These and other embodiments are described in greater detail below.

BRIEF DESCRIPTION OF THE FIGURES

This disclosure is illustrated by way of example and not limitation in the figures of the accompanying drawings, in which like references indicate similar elements, and in which.

DETAILED DESCRIPTION

A common use case of audio devices, such as conference phones, is when multiple participants in a room are having a conference with remote participants. However, there was no conventional standard recommendation to objectively measure the performance of group conference phones in the presence of multiple talkers in a conference room, until ITU-T P.340 Annex B became available in 2014 (ITU-T, *Objective Test Methods for Multi-Talker Scenarios*, ITU-T P.340 Annex B, 2014, hereby incorporated by reference and referred to as "ITU-T P.340 Annex B" ]. ITU-T P.340 Annex B provided a set of test methods and performance recommendations to characterize sending performance of conference phones and hands-free terminals, covering scenarios where multiple talkers are having interactive natural conversations in a room with remote participants listening.

In the methods described in ITU-T P.340 Annex B, artificial signals such as composite source signals (CSS) are specified as input signals, which are to be applied to the device under test (DuT) acoustically from different angles. The use of CSS makes it easy to characterize performance through simple level measurements. However, using CSS has two significant limitations. First, it is difficult to relate the measured objective performance to subjective ratings, due to the difficulty human subjects have in rating the quality of artificial signals. Also, some devices may process artificial signals and real speech signals differently, e.g. with signal processing techniques that make use of the specific spectral and temporal characteristics of speech. For such devices, the objective performance measured with artificial signals cannot reflect actual subjective impression of the daily use of the speaker phone.

Figure 1:
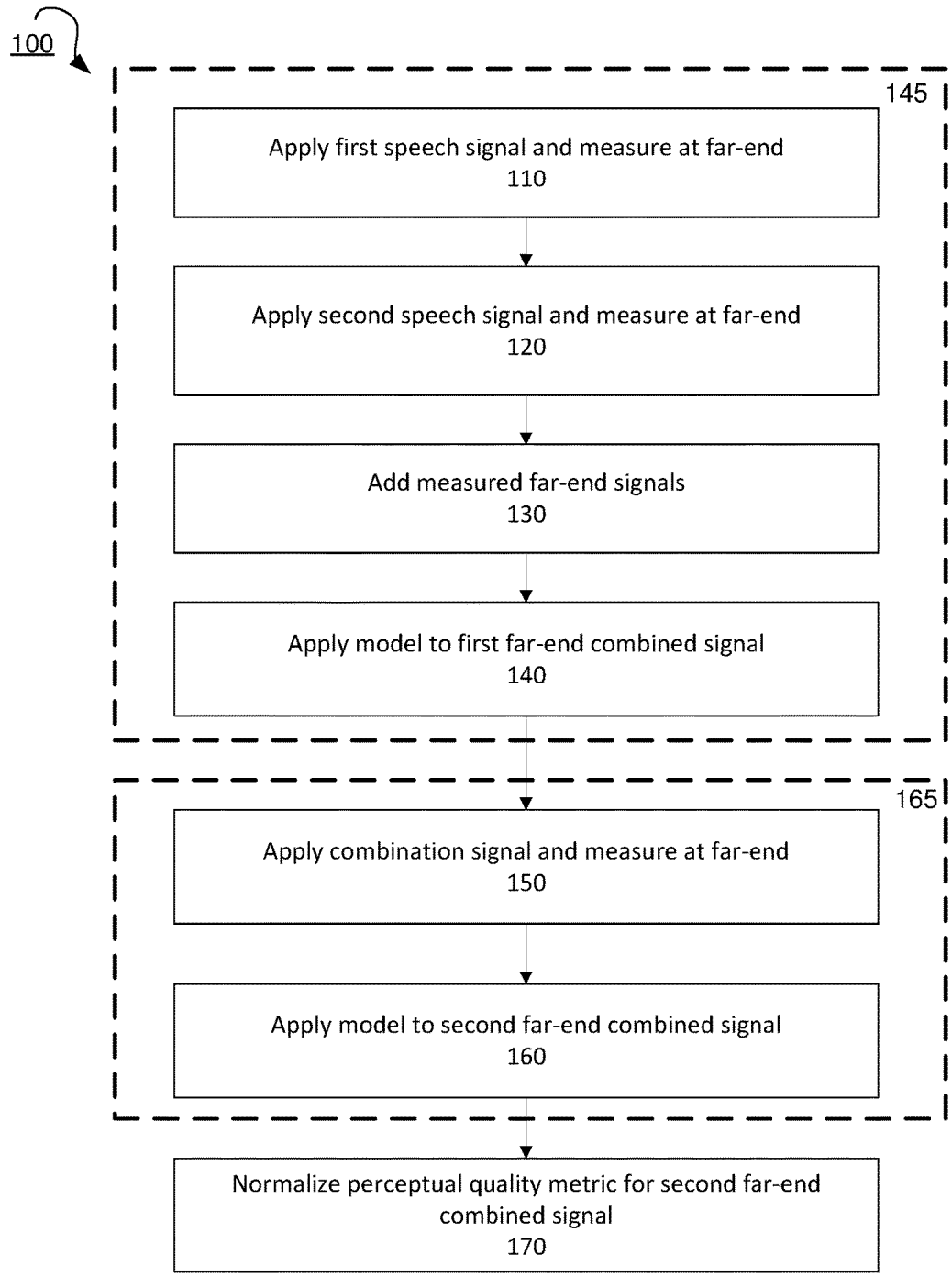
FIG. 1 shows a flow diagram for a method for improving device performance for capture of multiple voice signals, according to an embodiment.
Figure 2:
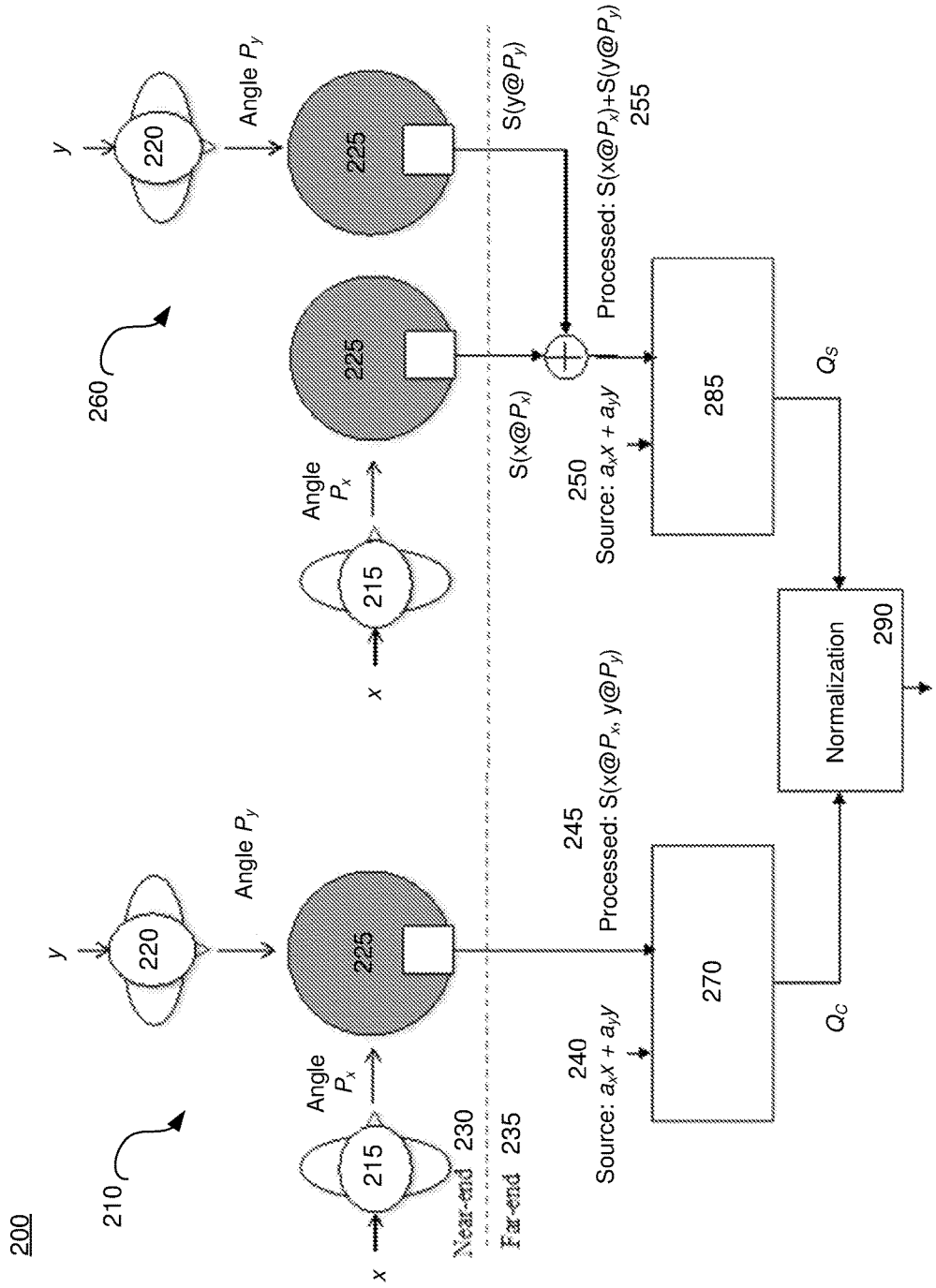
FIG. 2 shows a simplified block diagram of a system for measuring device performance for capture of multiple voice signals, according to an embodiment.

FIG. 1 shows a flow diagram for a method 100 for measuring device performance for capture of multiple voice signals, according to an embodiment. The methods for improved measurement of device performance described herein may be based on the principle that, for an ideal device, the perceived quality (and intelligibility) of transmitted speech when two talkers are speaking simultaneously is presumed to be same as that of sum of individually transmitted speech. Method 100 results in a performance index for a device being generated, for which potential applications are described below in FIGS. 4-5. FIG. 2 shows a simplified block diagram of a test environment 200 for measuring device performance for capture of multiple voice signals, according to an embodiment that uses the method 100. The exemplary test environment 200 includes device under test (DuTs) 225, first speech simulator 215 and second speech simulator 220 at a near end 230. The test environment 200 also includes objective modeling blocks 270 and 280 and normalization block 290 at a far end 235.

Method 100 includes three phases, indicated by reference numbers 145, 165, and 170 of FIG. 1. The first phase is reference phase 145, also shown as reference phase 260 of FIG. 2. In reference phase 260, a first speech signal x may be applied to the device 225 at a first angle $P_x$ of a near-end 230 of the testing environment 200 at step 110. The first speech signal x may be measured at the far-end 235 of the testing environment 200 to obtain a far-end first speech signal $S_x$. After the applying the first speech signal x, a second speech signal y is separately applied to the device 225 at a second angle $P_y$ at the near-end 230 at step 120. The second speech signal y is also measured at the far end 235 to obtain a far-end second speech signal $S_y$. Mathematically, $S_x$ and $S_y$ may be expressed as:

$$S_x = S\{x@P_x\}, S_y = S\{y@P_y\}, \quad (1)$$

Both first speech signal x and second speech y may include real speech signals instead of CSS, to better simulate device performance with multiple speakers. In a further embodiment, the testing can further approximate actual device performance by applying each of the first speech signal, the second speech signal, and the combination signal using speech delivery devices (e.g., a first speech delivery device and a second speech delivery device). The speech delivery device may be an artificial mouth of a field-equalized head and torso simulator (HATS), such as HATSs 215 and 220 in environment 200, in an exemplary embodiment.

Figure 3:
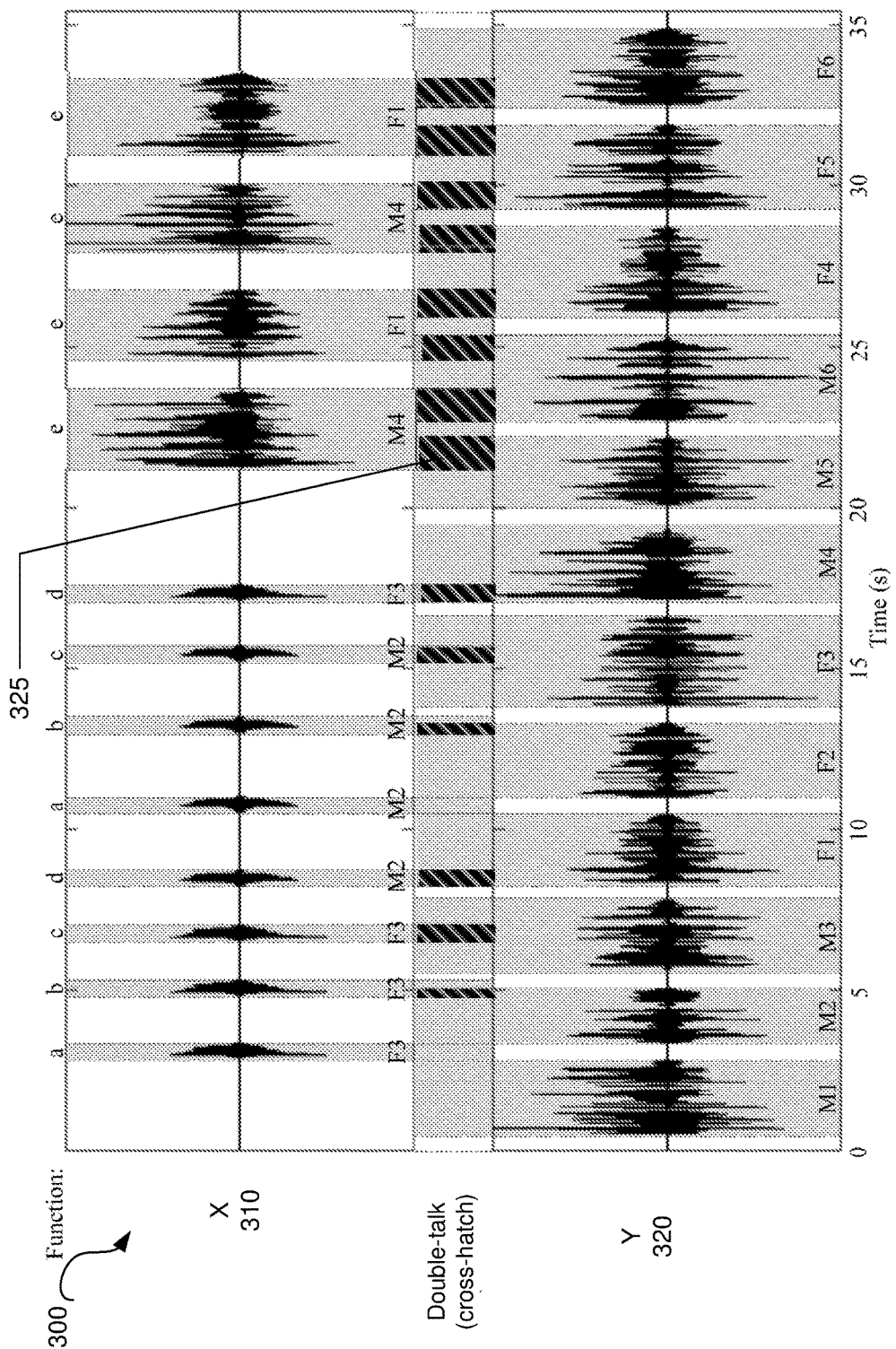
FIG. 3 shows exemplary plots of test input speech signals including concurrent speech.

For the described test, speech signals x and y may be signals originally used in double-talk testing for previous standards (see, e.g., FIG. 7-35 from ITU-T, *Test Signals for Use in Telephonometry*, ITU-T P.501, 1999, hereby incorporated by reference). FIG. 3 shows exemplary plots 300 of test input speech signals x 310 and y 320, including concurrent speech, that may be used for measuring device performance. The shaded intervals, such as interval 325, between the upper and lower panels represent concurrent speech intervals. The whole interval of the signals may used as input stimuli for the measuring, but the time interval [20 s, 35 s] in the measurement signal may be used for performance analysis in an exemplary embodiment, due to the prevalence of concurrent speech. The length of total concurrent speech in the shown example is 6.4 sec, which is 43% of entire length of speech when x and y are played out simultaneously in the [20 s, 35 s] interval.

Returning to FIGS. 1 and 2, the far-end first speech signal $S_x$ and the far-end second speech signal $S_y$ may be added electrically by linear addition at step 130 to obtain a first far-end combined signal 255. By adding the separately-input speech signals, an ideal conference phone processing may be simulated. The perceptual quality of the first far-end combined signal $(S\{x@Px\}+S\{y@Py\})$ may then be estimated by applying an objective quality assessment model, such as an ITU-T P.863 perceptual objective listening quality assessment ("POLQA") model (Beerends, John. G et all, *Perceptual Objective Listening Quality Assessment (POLQA), The Third Generation ITU-T Standard for End-to-End Speech Quality Measurement Part II—Perceptual Model*, ITU-T P.863, June 2013, hereby incorporated by reference) The quality assessment model may generate an objective perceptual quality metric for the first far-end combined signal 255 at step 140. The quality assessment model, which may be applied by processing block 285, may be mathematically expressed as:

$$Qs = Q[S_x + S_y]. \quad (2)$$

While embodiments described below use POLQA as the quality assessment model, the invention is not limited in this regard, and any suitable model may be utilized, including PESQ (see ITU-T Study Group 12, *Perceptual evaluation of speech quality (PESQ): An objective method for end-to-end speech quality assessment of narrow-band telephone networks and speech codecs*, ITU-T P.862, 2001, hereby incorporated by reference).

As seen in reference phase 260, $a_x x + a_y y$ may be used as a reference signal 250 input for the POLQA model. Variables $a_x$ and $a_y$ may represent the long-term gain of $S_x$ compared to x and the gain of $S_y$ compared to y, respectively. The gains $a_x$ and $a_y$ may be measured in a predetermined time interval, such as the window [20 s, 35 s] of each input speech signal, for example, to compensate for potential anisotropy of the device over different angles. That is, devices under test and the testing environment 200 may have different direction-dependent gain factors, which can be factored in and removed using the reference signal 250.

After the speech signals x and y are applied separately, one at a time, in the reference phase 145, the test phase 165 may be executed. The test phase 165, which is also indicated by reference number 210 in FIG. 2, includes applying a combination signal, including both the first speech signal x at the first angle $P_x$ and the second speech signal y at the second angle $P_y$, at substantially the same time at the near-end 230 in step 150. Applying both speech signals at the same time may simulate concurrent speech signals, and the speech signals may be applied using HATSs as described above. The applying both signals may take place after the separate applying the first speech signal and the second speech signal in the reference phase 260.

The combination signal may be measured at the far-end 235 to obtain a second far-end combined speech signal 245. The measurement signal obtained at the far-end 235 may be expressed as:

$$S_{xy} = S\{x@P_x, y@P_y\}. \quad (3)$$

The quality assessment model may then be applied to the second far-end combined signal to obtain a perceptual quality metric for the second far-end combined signal at step 160 (e.g., by processing block 270). In embodiments where the quality assessment model is POLQA, the perceptual quality of $S_{xy}$ is estimated as:

$$Qc = Q[S_{xy}] \quad (4)$$

Again, as seen in test phase 210, the model may be applied with $a_x x + a_y y$ as a reference signal 240, where $a_x$ and $a_y$ are the same values obtained in the reference phase.

In the third phase of the method 100, the perceptual quality metric for the second far-end combined signal, Qc, may be normalized, based on the perceptual quality metric for the first far-end combined signal, Qs, to obtain a performance index for the device at step 170. The normalizing may be performed by processing block 290, and the performance index RQ may be a value that objectively measures the quality of the test phase relative to that of the reference phase. The performance index RQ may be a better measure of device performance than the direct value of Qc due to the limited scope of the POLQA model.

While POLQA may be a state-of-the-art objective model to estimate speech quality, some DuT-dependent processing characteristics, which may not necessarily cause subjective quality degradation, can actually impact POLQA scores differently for different devices. For example, POLQA is known to underestimate the quality of speech with some acoustic coupling and reverberant conditions (e.g. caused by an audio capture device's microphone placement and/or a speaker's distance from the microphone, microphone characteristics, codecs being used for capture, frequency response, and EQ settings). That is, it may be difficult to take analytic approaches to determine the impact of linear filtering (reverberation can be modeled by linear filters) in POLQA scores, due to the multi-stage nonlinear operation of POLQA and the lack of quantitative relationship between different filters and their impact on subjective scores. Thus, the use of Qc in comparing different DuTs may result in erroneous guidance, especially when comparing multiple DuTs. This limitation can be alleviated by using Qs together with Qc, as the difference between Qc and Qs is in the concurrent speech intervals.

In an exemplary embodiment, it is assumed that the impact of acoustic coupling, a bias caused by factors such as a speaker's distance from a microphone and device capture characteristics, is a multiplicative term in a POLQA score, and can be cancelled out by a division operator. One way for the performance index to offset the impact of acoustic coupling is by dividing Qc by Qs to obtain the performance index RQ. RQ is found to compensate for the POLQA limitation effectively and pick up the degradation in concurrent speech intervals, resulting in a metric highly correlated to subjective test results. Modifications of this principle may also be used. For example, in an embodiment, the performance index may be defined as:

$$RQ=[Qc-1]/[Qs-1]. \quad (5)$$

Other definitions for the performance index may be used. For example, the normalizing the perceptual quality metric for the second far-end combined signal may be defined by subtracting the perceptual quality metric for the second far-end combined signal Qc from the perceptual quality metric for the first far-end combined signal Qs. While the correlation between a subtractive performance index and subjective results may not be as strong as using a division operator, the subtractive performance index may still offer an improvement when compared to using Qc alone to quantify device performance in concurrent speech intervals.

Figure 4:
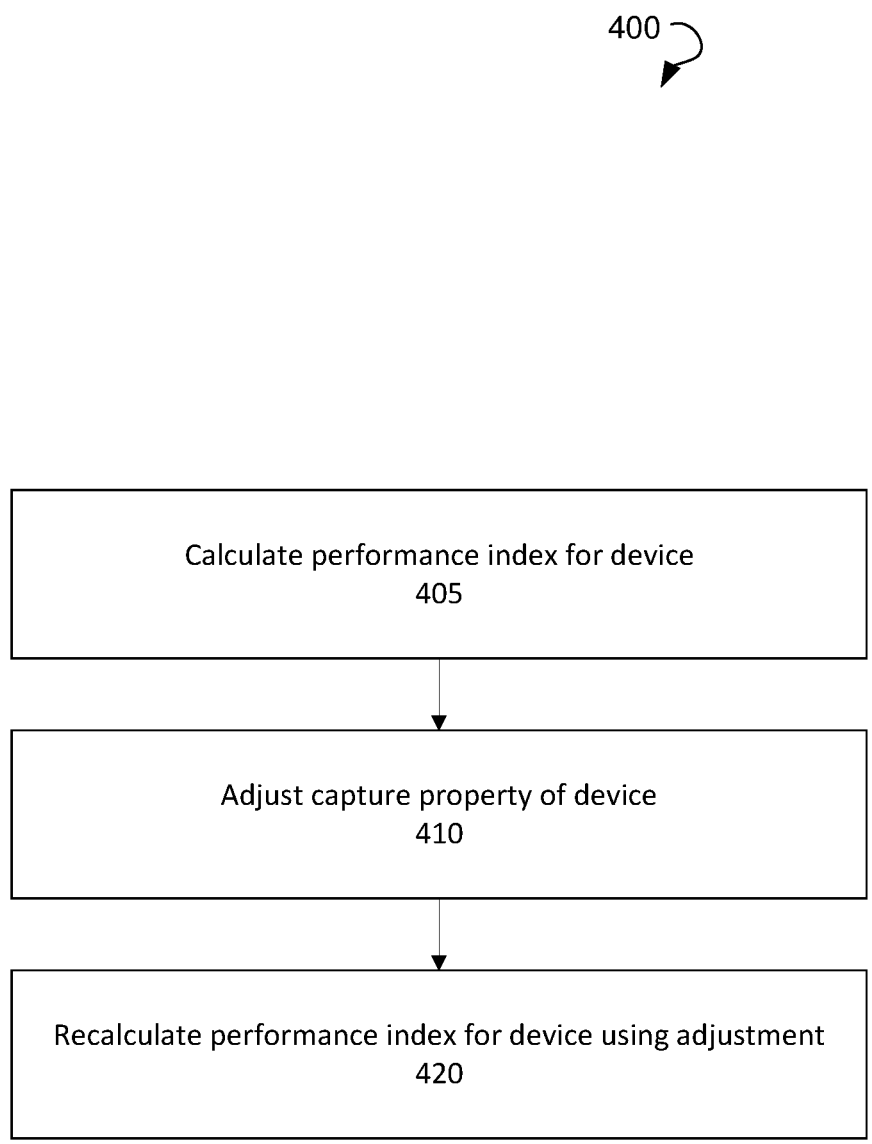
FIG. 4 shows a flow diagram for a method of improving device performance for capture of multiple voice signals by a device, according to an embodiment.

There are many useful applications for the method for measuring device performance for capture of multiple voice signal as described above. One such application is shown in FIG. 4, a flow diagram for a method 400 of improving device performance (e.g., in product development) for capture of multiple voice signals by a device, according to an embodiment. At step 405, a performance index for a device under test is calculated (e.g., using method 100). In response to receiving the performance index for the device, a capture property of the device may be adjusted at step 410, such that the adjusting increases a value of the performance index in subsequent testing. Examples of capture properties may include microphone properties, device frequency response, audio codec parameters and/or algorithms, EQ settings, and the like. At step 420 the performance index for the device may be recalculated (again using the method 100, for example) using the adjustment in the capture properties.

Figure 5:
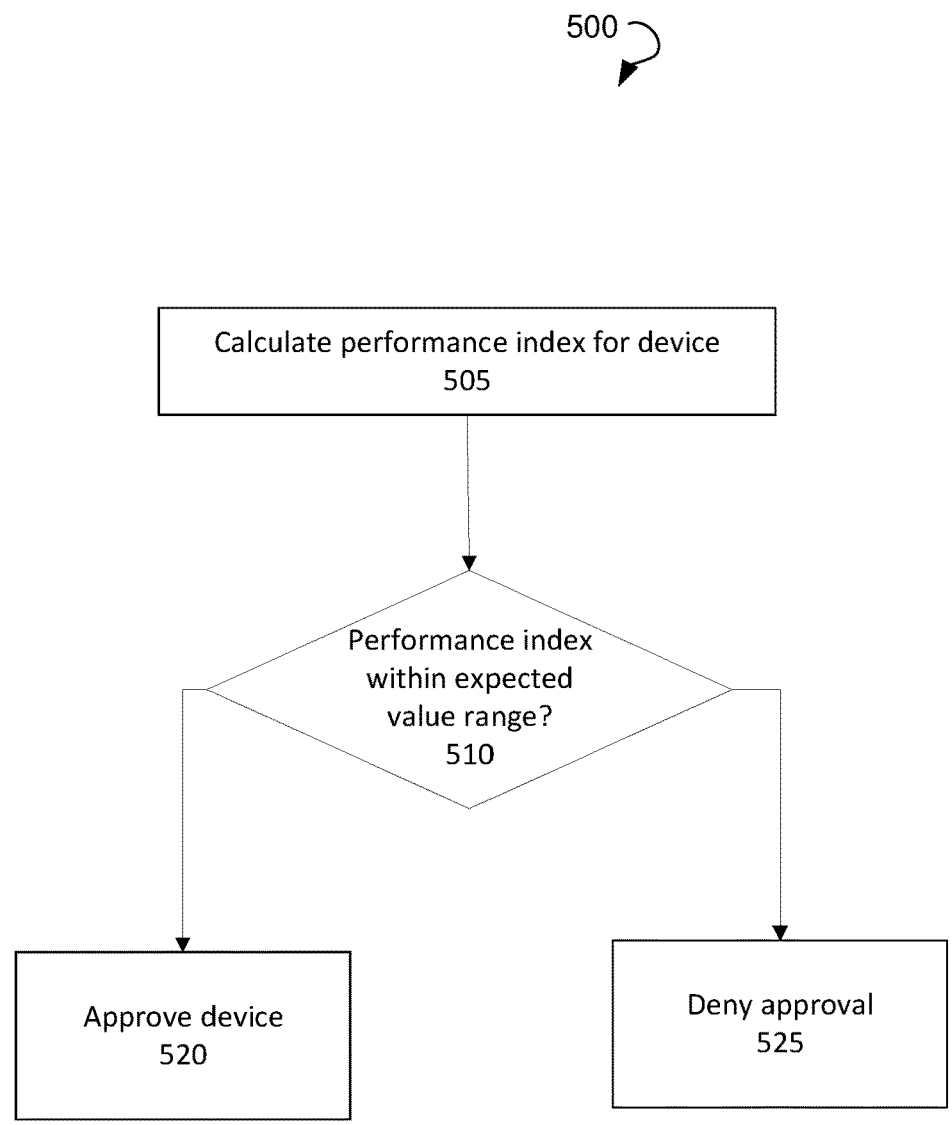
FIG. 5 shows a flow diagram for a method of verifying that device performance for capture of multiple voice signals meets a standard, according to an embodiment.

Another application for the method for measuring device performance for capture of multiple voice signals is to make sure that a device meets a standard level of performance (e.g., in quality control, or standard certification). FIG. 5 shows a flow diagram for a method 500 of verifying that device performance for capture of multiple voice signals meets a standard, according to an embodiment. At step 505, a performance index for a device under test is calculated (e.g., using method 100). The performance index may be compared to an expected value range, corresponding to a desired level of concurrent speech capture performance, at step 510. If the device's performance index falls within the expected value range, the device may be approved at step 520. Approval may be denied when the device's performance index falls outside of the expected value range at step 525.

Figure 6:
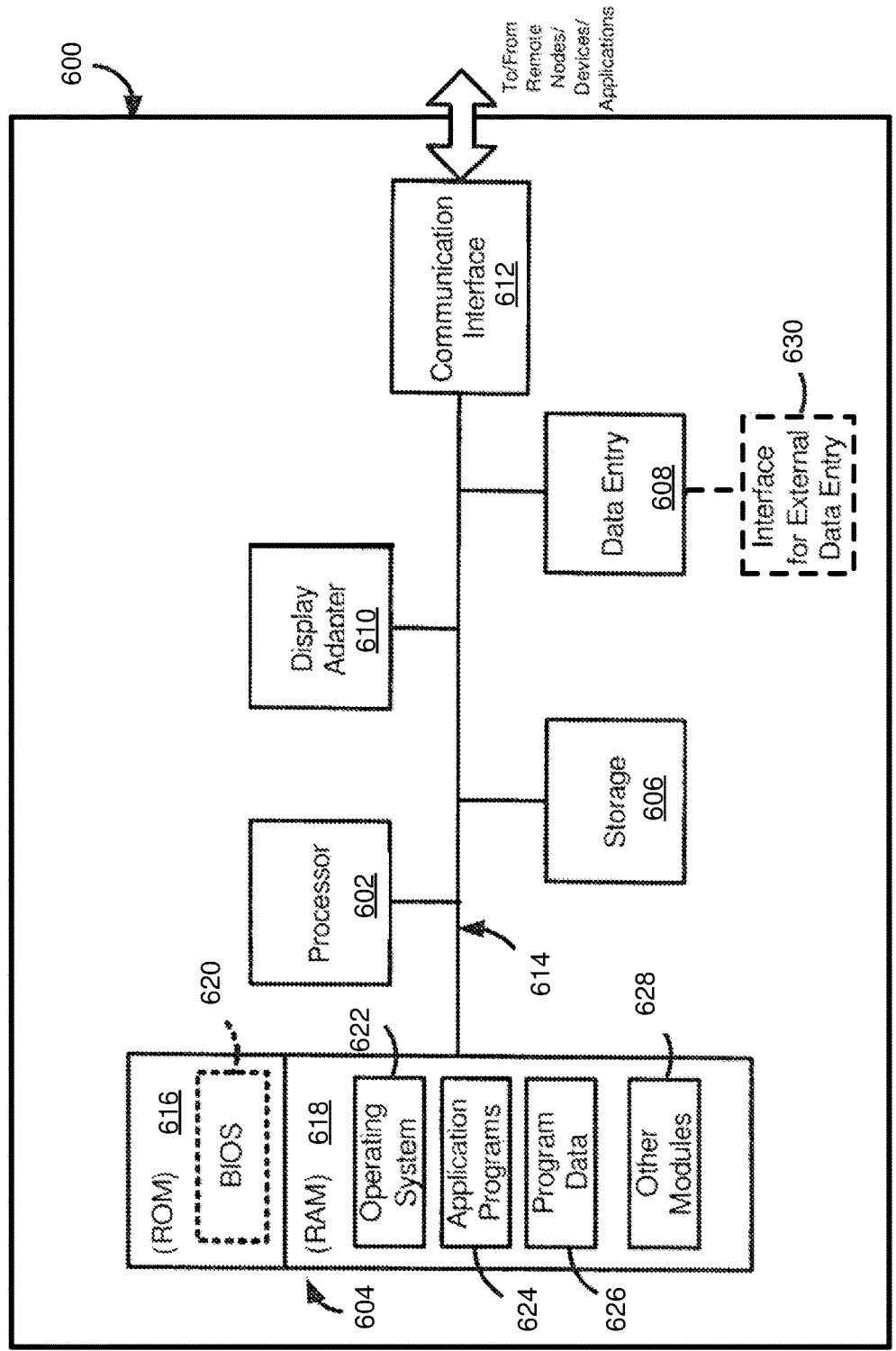
FIG. 6 is a block diagram of an exemplary computer system for measuring device performance for capture of multiple voice signals, according to an embodiment.

FIG. 6 is a block diagram of an exemplary system for measuring device performance for capture of multiple concurrent voice signals with various embodiments of the present invention. With reference to FIG. 6, an exemplary system for implementing the subject matter disclosed herein, including the methods described above, includes a hardware device 600, including a processing unit 602, memory 604, storage 606, data entry module 608, display adapter 610, communication interface 612, and a bus 614 that couples elements 604-612 to the processing unit 602.

The bus 614 may comprise any type of bus architecture. Examples include a memory bus, a peripheral bus, a local bus, etc. The processing unit 602 is an instruction execution machine, apparatus, or device and may comprise a microprocessor, a digital signal processor, a graphics processing unit, an application specific integrated circuit (ASIC), a field programmable gate array (FPGA), etc. The processing unit 602 may be configured to execute program instructions stored in memory 604 and/or storage 606 and/or received via data entry module 608.

The memory 604 may include read only memory (ROM) 616 and random access memory (RAM) 618. Memory 604 may be configured to store program instructions and data during operation of device 600. In various embodiments, memory 604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 604 may also include nonvolatile memory technologies such as nonvolatile flash RAM (NVRAM) or ROM. In some embodiments, it is contemplated that memory 604 may include a combination of technologies such as the foregoing, as well as other technologies not specifically mentioned. When the subject matter is implemented in a computer system, a basic input/output system (BIOS) 620, containing the basic routines that help to transfer information between elements within the computer system, such as during start-up, is stored in ROM 616.

The storage 606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 600.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 606, ROM 616 or RAM 618, including an operating system 622, one or more applications programs 624, program data 626, and other program modules 628. A user may enter commands and information into the hardware device 600 through data entry module 608. Data entry module 608 may include mechanisms such as a keyboard, a touch screen, a pointing device, etc. Other external input devices (not shown) are connected to the hardware device 600 via external data entry interface 630. By way of example and not limitation, external input devices may include a microphone, satellite dish, scanner, or the like. In some embodiments, external input devices may include video or audio input devices such as a video camera, a still camera, etc. Data entry module 608 may be configured to receive input from one or more users of device 600 and to deliver such input to processing unit 602 and/or memory 604 via bus 614.

The hardware device 600 may operate in a networked environment using logical connections to one or more remote nodes (not shown) via communication interface 66. The remote node may be another computer, a server, a router, a peer device or other common network node, and typically includes many or all of the elements described above relative to the hardware device 600. The communication interface 612 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 612 may include logic configured to support direct memory access (DMA) transfers between memory 604 and other devices.

In a networked environment, program modules depicted relative to the hardware device 600, or portions thereof, may be stored in a remote storage device, such as, for example, on a server. It will be appreciated that other hardware and/or software to establish a communications link between the hardware device 600 and other devices may be used.

It should be understood that the arrangement of hardware device 600 illustrated in FIG. 6 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 600. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 6. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

Systems and methods are described for providing improving capture performance of a device of multiple voice signals. The testing of a device, in an embodiment, includes a reference phase, where a first speech signal is applied to a device at a first angle. The first speech signal may be measured at a far-end of a testing environment to obtain a far-end first speech signal. After the applying the first speech signal, a second speech signal is separately applied to the device at a second angle. The second speech signal is also measured at the far end to obtain a far-end second speech signal. The far-end first speech signal and the far-end second speech signal may be added by linear addition to obtain a first far-end combined signal. A quality assessment model (for example, a perceptual objective listening quality assessment (POLQA) model) may be applied to the first far-end combined signal to obtain an objective perceptual quality metric for the first far-end combined signal.

After the reference phase, a test phase may be executed, which includes applying a combination signal, including both the first speech signal at the first angle and the second speech signal at the second angle being applied at substantially the same time. The applying both signals may take place after the separate applying the first speech signal and the second speech signal in the reference phase. The combination signal may be measured at the far-end to obtain a second far-end combined speech signal. The quality assessment model may be applied to the second far-end combined signal to obtain a perceptual quality metric for the second far-end combined signal. The perceptual quality metric for the second far-end combined signal is normalized, based on the perceptual quality metric for the first far-end combined signal, to obtain a performance index for the device.

The performance index may accurately assess the device's performance for simultaneous talkers, and may be used in a variety of applications. For example, during product development, a capture property of the device may be adjusted, such that the adjusting increases a value of the performance index in subsequent testing. In another embodiment, the performance index may be used in device quality control testing. For example, the performance index may be compared to an expected value range. The device may be approved if the performance index of the device falls within the expected value range. If the device has a performance index that falls outside the expected value range, approval may be denied.

Different types of normalization may be utilized. For example, the normalizing the perceptual quality metric for the second far-end combined signal may include dividing the perceptual quality metric for the second far-end combined signal by the perceptual quality metric for the first far-end combined signal to obtain the performance index. In other embodiments, normalizing the perceptual quality metric for the second far-end combined signal may include subtracting the perceptual quality metric for the second far-end combined signal from the perceptual quality metric for the first far-end combined signal to obtain the performance index.

The testing environment advantageously may simulate actual concurrent voice signals better than conventional testing methods. Further embodiments may further improve the accuracy of the testing and measurement of device performance. For example the applying each of the first speech signal, the second speech signal, and the combination signal may be performed using an artificial mouth of a head and torso simulator (HATS). Also, each of the first speech signal, the second speech signal, and the combination signal may be real speech signals.

What is claimed is:

1. A method for improving device performance for capture of multiple voice signals by a device, the method comprising:

applying a first speech signal to the device at a first angle;

measuring the first speech signal at a far-end of a testing environment to obtain a far-end first speech signal;

separately applying, after the applying the first speech signal, a second speech signal to the device at a second angle;

measuring the second speech signal at the far end to obtain a far-end second speech signal;

adding the far-end first speech signal and the far-end second speech signal by linear addition to obtain a first far-end combined signal;

applying a quality assessment model to the first far-end combined signal to obtain a perceptual quality metric for the first far-end combined signal;

applying a combination signal, comprising both the first speech signal at the first angle and the second speech signal at the second angle being applied at substantially the same time, the combination signal being applied after the separate applying the first speech signal and the second speech signal;

measuring the combination signal at the far-end to obtain a second far-end combined speech signal;

applying the quality assessment model to the second far-end combined signal to obtain a perceptual quality metric for the second far-end combined signal;

normalizing the perceptual quality metric for the second far-end combined signal based on the perceptual quality metric for the first far-end combined signal to obtain a performance index for the device; and adjusting a capture property of the device, such that the adjusting increases a value of the performance index in subsequent testing.

2. The method of claim 1, wherein the normalizing the perceptual quality metric for the second far-end combined signal comprises dividing the perceptual quality metric for the second far-end combined signal by the perceptual quality metric for the first far-end combined signal to obtain the performance index.

3. The method of claim 1, the quality assessment model being a perceptual objective listening quality assessment (POLQA) model.

4. The method of claim 1, wherein the applying each of the first speech signal, the second speech signal, and the combination signal is performed using an artificial mouth of a head and torso simulator (HATS).

5. The method of claim 1, wherein each of the first speech signal, the second speech signal, and the combination signal comprise real speech signals.

6. The method of claim 1, wherein the normalizing the perceptual quality metric for the second far-end combined signal comprises subtracting the perceptual quality metric for the second far-end combined signal from the perceptual quality metric for the first far-end combined signal to obtain the performance index.

7. The method of claim 1, wherein the normalizing the perceptual quality metric for the second far-end combined signal comprises setting the performance index to equal $[Qc-1]/[Qs-1]$, wherein $Qc$ is the perceptual quality metric for the second far-end combined signal and $Qs$ is the perceptual quality metric for the first far-end combined signal.

8. A system comprising,
an audio capture device at a near end of a testing environment;
a first speech delivery device positioned at a first angle with respect to the audio capture device, the first speech delivery device applying a first speech signal that is measured at a far end of the testing environment to produce a far-end first speech signal;
a second speech delivery device positioned at a second angle with respect to the audio capture device, the second speech delivery device separately applying, after the applying the first speech signal, a second speech signal that is measured at the far end to produce a far-end second speech signal; and
a processor, the processor being configured to:
add the far-end first speech signal and the far-end second speech signal by linear addition to obtain a first far-end combined signal; and
apply a quality assessment model to the first far-end combined signal to obtain a perceptual quality metric for the first far-end combined signal, the first speech delivery device and the second speech delivery device, after the separately applying the first speech signal and the second speech signal, applying a combination signal, comprising both the first speech signal and the second speech signal being applied at substantially the same time, the combination signal being measured at the far-end to obtain a second far-end combined speech signal, the processor being further configured to:
apply the quality assessment model to the second far-end combined signal to obtain a perceptual quality metric for the second far-end combined signal; and
normalize the perceptual quality metric for the second far-end combined signal based on the perceptual quality metric for the first far-end combined signal to obtain a performance index for the device, a capture property of the audio capture device being adjusted such that the adjusting increases a value of the performance index in subsequent testing.

9. The system of claim 8, wherein the normalizing the perceptual quality metric for the second far-end combined signal comprises dividing the perceptual quality metric for the second far-end combined signal by the perceptual quality metric for the first far-end combined signal to obtain the performance index.

10. The system of claim 8, the quality assessment model being a perceptual objective listening quality assessment (POLQA) model.

11. The system of claim 8, wherein the first speech delivery device and the second speech delivery device are both head and torso simulators (HATSs), the applying each of the first speech signal, the second speech signal, and the combination signal being performed using an artificial mouth of the corresponding HATS.

12. The system of claim 8, wherein each of the first speech signal, the second speech signal, and the combination signal comprise real speech signals.

13. The system of claim 8, wherein the normalizing the perceptual quality metric for the second far-end combined signal comprises subtracting the perceptual quality metric for the second far-end combined signal from the perceptual quality metric for the first far-end combined signal to obtain the performance index.

14. A method for verifying that device performance for capture of multiple voice signals meets a standard, the method comprising:
applying a first speech signal to a device at a first angle;
measuring the first speech signal at a far-end of a testing environment to obtain a far-end first speech signal;
separately applying, after the applying the first speech signal, a second speech signal to a device at a second angle;
measuring the second speech signal at the far end to obtain a far-end second speech signal;
adding the far-end first speech signal and the far-end second speech signal by linear addition to obtain a first far-end combined signal;
applying a quality assessment model to the first far-end combined signal to obtain a perceptual quality metric for the first far-end combined signal;
applying a combination signal, including both the first speech signal at the first angle and the second speech signal at the second angle, at substantially the same time, the applying both signal taking place after the separate applying the first speech signal and the second speech signal;
measuring the combination signal at the far-end to obtain a second far-end combined speech signal;
applying the quality assessment model to the second far-end combined signal to obtain a perceptual quality metric for the second far-end combined signal;
normalizing the perceptual quality metric for the second far-end combined signal based on the perceptual quality metric for the first far-end combined signal to obtain a performance index for the device;
comparing the performance index to an expected value range, where the device is approved if the performance index falls within the expected value range; and
denying approval to the device when the performance index falls outside of the expected value range.

15. The method of claim 14 wherein the normalizing the perceptual quality metric for the second far-end combined signal comprises dividing the perceptual quality metric for the second far-end combined signal by the perceptual quality metric for the first far-end combined signal to obtain the performance index.

16. The method of claim 14, the quality assessment model being a perceptual objective listening quality assessment (POLQA) model.

17. The method of claim 14, wherein the applying each of the first speech signal, the second speech signal, and the combination signal is performed using an artificial mouth of a head and torso simulator (HATS).

18. The method of claim 14, wherein each of the first speech signal, the second speech signal, and the combination signal comprise real speech signals.

19. The method of claim 14, wherein the normalizing the perceptual quality metric for the second far-end combined signal comprises subtracting the perceptual quality metric for the second far-end combined signal from the perceptual quality metric for the first far-end combined signal to obtain the performance index.

20. The method of claim 14, wherein the normalizing the perceptual quality metric for the second far-end combined signal comprises setting the performance index to equal $[Qc-1]/[Qs-1]$, wherein Qc is the perceptual quality metric for the second far-end combined signal and Qs is the perceptual quality metric for the first far-end combined signal.

* * * * *